United States Patent
Bakhir et al.

[11] Patent Number: 5,540,819
[45] Date of Patent: Jul. 30, 1996

[54] WATER TREATMENT METHOD

[75] Inventors: Vitold M. Bakhir; Viktor G. Vedenkov; Boris I. Leonov; Vladimir I. Prilutsky, all of Moscow; Evgeny A. Repetin, Moskovskaya; Jury G. Zadorozhny, Tashkent; Nikolai N. Naida, Moscow; Oleg A. Mashkov, Moscow; Nugzar V. Dzheiranishvili, Moscow; Sergei K. Butin, Moscow, all of Russian Federation

[73] Assignee: Nauchno-Proizvodstvennoe Obiedinenie "Ekran" Vsesojuzny Nauchno-Issledovatelsky I Ispytatelny Institut Meditsinskoi Tekhniki, Moscow, Russian Federation

[21] Appl. No.: 435,524

[22] Filed: May 5, 1995

Related U.S. Application Data

[63] Continuation of Ser. No. 71,450, Jun. 2, 1993, abandoned.

[30] Foreign Application Priority Data

Jun. 4, 1992 [RU] Russian Federation ............... 5065078

[51] Int. Cl.$^6$ ............................. C02F 1/461; C02F 1/467
[52] U.S. Cl. ............................................................ 205/747
[58] Field of Search ................................... 204/151, 152, 204/263, 264, 275, 276

[56] References Cited

U.S. PATENT DOCUMENTS 3,910,829 10/1975 Eibl et al. ............................. 204/151
3,919,062 11/1975 Lundquist, Jr. et al. ............... 204/149

FOREIGN PATENT DOCUMENTS 1171428 8/1985 U.S.S.R. .

Primary Examiner—Arun S. Phasge
Attorney, Agent, or Firm—Ladas & Parry

[57] ABSTRACT

There is proposed a water treatment method by causing the water to be purified to flow through a first and a second compartments arranged in succession in an electrolysis cell divided by a permeable membrane into said first and second compartments. Each of the compartments accomodates an electrode, one of them being an anode, and the other—a cathode. Direct electric current is then passed through the water between the anode and the cathode, the current value being determined from the following equation:

$$I = K \times (C)^{1/4} \times Q,$$

wherein
I is the current amperage (A),
C is the feed water mineralization equal to 0.1–1.5 g/l,
Q is the water flow rate (l/hour), $$K = 0.056 \left( \frac{A \times h}{g^{1/4} \times l^{3/4}} \right),$$

the I/Q ratio being comprised within from about 110 to about 220 Coulomb/liter. The water is caused to flow successively from the anode compartment towards the cathode compartment. Once the water is discharged from the cathode compartment, it is subjected to filtering by passing the water through a bed of a porous carbonaceous material.

1 Claim, 1 Drawing Sheet

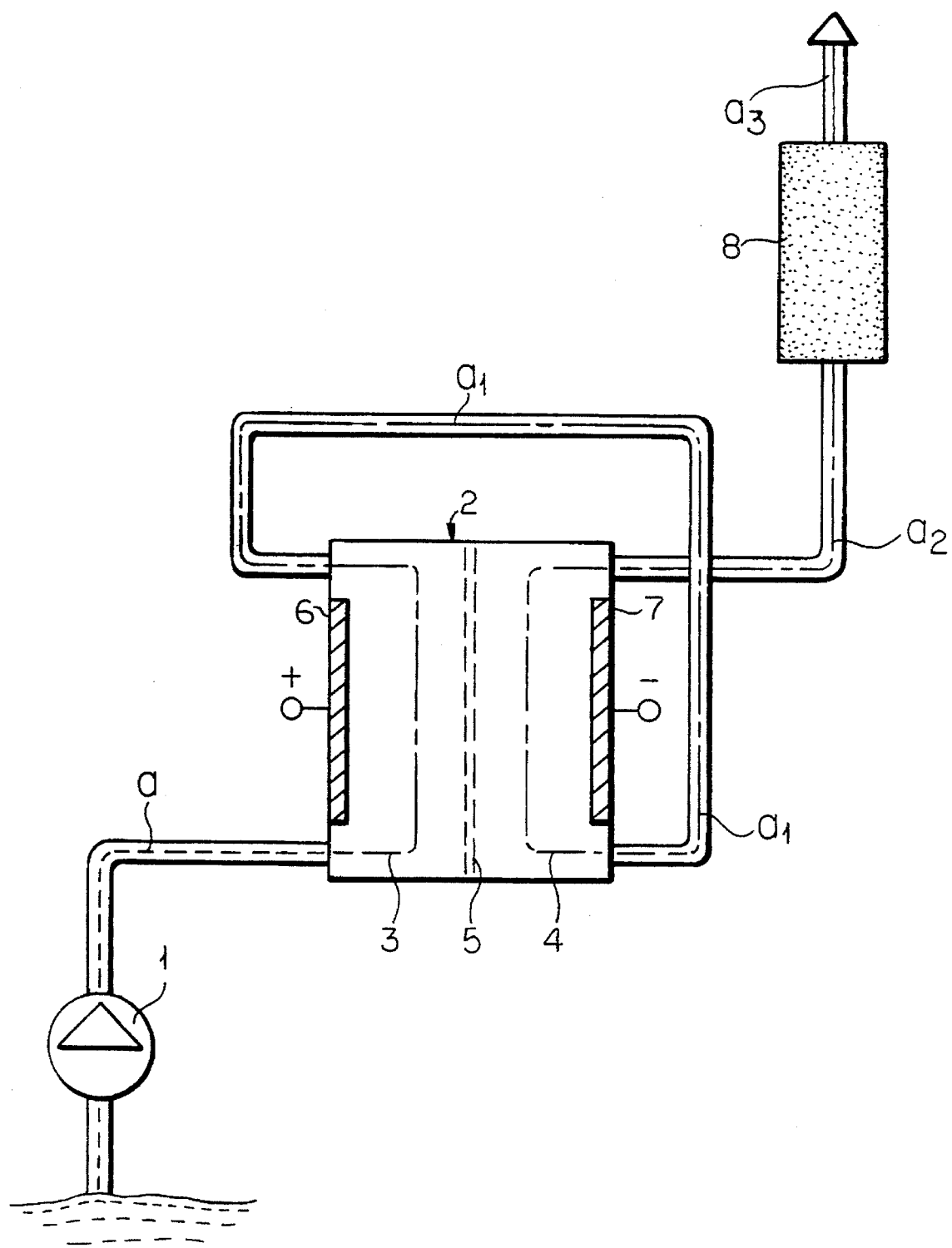

WATER TREATMENT METHOD

This is a continuation of copending application(s) Ser. No. 08/071,450 filed on Jun. 2, 1993, now abandoned.

This invention relates to the field of electrolytic water treatment and, more specifically, to a method for electrochemical purification of drinkable water from microorganisms, organic harmful substances and heavy metal ions.

The present invention may be used to best advantage for preparing pure drinkable water from fresh water polluted with pathogenic microorganisms.

BACKGROUND OF THE INVENTION

Rapid growth of population and impetuous development of industry have caused a steady growth in water consumption. In thinly populated developing areas, as well as in large cities, owing to sharp deterioration of environmental conditions, for instance, because of spring high-flood, the water quality sharply drops so that the requirements for drinkable water cannot be met. Therefore, a need arose to purify fresh water from pollutants.

Known in the prior art is a method for electrolytic water treatment for improving properties of water (Ref. U.S. Pat. No. 3,910,829). In accordance with the above-cited method, the water is subjected to electrochemical treatment in a flow-through hydraulic system comprising three in-series connected membrane-type electrolysis cells. The water is successively treated, first in the cathode compartment of a first electrolysis cell and next in the anode compartments of second and third electrolysis cells. The water treated by the above-cited method contains considerable quantities of products resulting from anodic oxidation and is fully disinfected, without, however, meeting the requirements for drinkable water. Moreover, the above-cited process, apart from the three membrane-type electrolysis cells, necessitates the presence of a system intended to preset, in synchronism, the operational conditions of the electrolysis cells, whereby the practicability of the process is rendered considerably more difficult.

Equally known in the prior art is another electrolytic water purification process (Ref. USSR Inventor's Certificate No. 1,171,428; publ. in Bulletin No. 29; 1985), whereby water is caused to flow through a first and a second compartments of an electrolysis cell. The latter is divided by a permeable partition into first and second compartments, each of which accomodates an electrode, one of these electrodes being an anode, and the other—a cathode. Next electric current is caused to flow through the water between the anode and the cathode. The water flows in succession through the cathode and anode compartments, and, prior to entering the anode compartment, the water is subjected to filtering. Because of the above-described sequence of the compartments, through which the water is caused to flow, the water after treatment in the anode compartment contains residual anodic oxidation products, such as, e.g. $HClO$, $ClO^-$ which are toxic for the human organism.

SUMMARY OF THE INVENTION

It is the object of the present invention to develop a method for treatment of water polluted with microorganisms, organic harmful substances and heavy metals ions. In the method, owing to a preset sequence of overflow of the water flow from one compartment to another of an electrolysis cell and owing to maintaining the preset electric current value in the inter-electrode space, a pure drinkable water would be obtained from starting fresh water.

This object is accomplished by a water treatment method comprising the steps of causing water to flow through first and second compartments of an electrolysis cell. The first and second compartments are divided by a permeable membrane. The first and second compartments each accomodates an electrode, the electrode in the first compartment is an anode, and the electrode in the second compartment is a cathode. An electric current is passed through the water between an anode and a cathode. The water is removed from the cathode compartment; the water is filtered and removed. The improvements in accordance with the present invention are, namely: the water is caused to successively overflow from the anode compartment to the cathode compartment, and the electric current flowing through the water between an anode and a cathode is direct and its value is determined from the following equation:

$$I = K \times (C)^{1/4} \times Q,$$

wherein

I is the current amperage (A),

C is the feed water mineralization (0.1–1.5 g/l),

Q is the water flow rate (g/l),

K is equal to $$0.056 \left( \frac{A \times h}{g^{1/4} \times l^{3/4}} \right),$$

the I/Q ratio being comprised within from about 110 to about 220 coulomb/liter.

The above-described process flow-sheet makes it possible to obtain pure potable water from fresh water polluted with microorganisms, deleterious organic substances, such as, e.g. phenols, and heavy metals ions, such as, e.g. copper, iron and lead ions. The recommended sequence, whereby the water flow is directed from the anode compartment towards the cathode compartment of an electrolysis cell, is brought about and explained by the following consideration: during the water flow through the anode compartment, there takes place the formation of anodic oxidation products, such as, e.g. $HClO$, $ClO^-$ from salts constituting natural mineralization of any fresh water, as well as the formation of ozone and oxygen which destroys microorganisms in water and oxidize organic impurities, such as, e.g. phenol

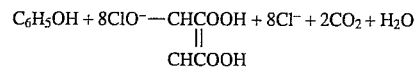

and formaldehyde

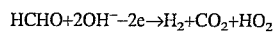

to form substances which are nontoxic for humans, such as water, carbon dioxide gas, carboxylic acid, which are always present in the human body.

The equation governing the electric current value flowing through water between the electrodes has been derived experimentally. It has been established by way of experimentation that at a I/Q ratio of below 110 coulomb/liter over the entire range of the mineralization "C" values of the feed water, no pure drinkable water is obtained, while at a I/Q ratio of above 220 coulomb/liter over the entire range of the mineralization "C" values of the feed water, increased energy consumption does not result in an improved quality of potable water.

BRIEF DESCRIPTION OF THE DRAWING

FIG. 1 is a schematic representation of a hydraulic system for carrying out this invention.

DESCRIPTION OF THE INVENTION

The substance of the present invention will be better understood from the following description of a specific embodiment thereof and from FIG. 1.

DETAILED DESCRIPTION OF THE PREFERRED EMBODIMENTS

The method of the present invention is carried out in the following manner:

Feed fresh water having a mineralization C=0.8 g/l and polluted with microorganisms, such as, e.g. Legionellae pneumophillae at a rate of $8 \times 10^6$ units/ml is subjected to treatment by the method in accordance with the present invention with a view of converting it into pure drinkable water in an electrolysis cell, whose structural arrangement is described in detail in a booklet by Bakhir B. M. and Zadorozhny Yu. G. "Electrochemical PRE-Model Reactors", vol. 4, Moscow, 1991. The water to be purified is denoted in the drawing by a dash-dot line "a" is supplied by a pump 1 having a flow rate of, e.g. 20 l/hour to an electrolysis cell (Chamber 2). Chamber 2 is divided into a first compartment 3 and a second compartment 4 by a permeable membrane or diaphragm 5 made of zirconia-based ceramics. The compartment 3 accomodates an electrode 6 serving as an anode, whereas the compartment 4 accomodates an electrode 7 to constitute a cathode. The water to be purified flows successively through the first anode compartment 3 and second cathode compartment 4. Direct electric current is caused to pass through the liquid in between the electrodes 6 and 7, the electric current value being determined from the equation:

$$I = K \times (C)^{1/4} \times Q,$$

wherein

I is the current amperage (A),

C is the feed water mineralization equal to 0.8 g/l,

Q is the water flow rate equal to 20 l/hour, $$K = 0.056 \left( \frac{A \times h}{g^{1/4} \times l^{3/4}} \right).$$

As the water to be purified flows in the direction shown by the dash-dot line "a" through the compartment 3, anodic oxidation products, such as, e.g. HClO and ClO⁻, are formed from salts consituting natural mineralization of any drinkable water. Active chlorine compounds ClO⁻, HClO, Cl₂, as well as ozone, oxygen and free radicals Cl⁻, O⁻, HO₂⁻ formed at the anode 6 destroy Legionella pneumophilla and oxidize organic pollutants, such as, e.g. phenols:

$$C_6H_5OH + 8ClO^- \rightarrow CHCOOH + 8Cl^- + 2CO_2 + H_2O$$

and formaldehyde:

$$HCHO + 2OH^- - 2 \rightarrow H_2 + CO_2 + HO_2$$

to form substances which are nontoxic to humans, and amongst these substances water, carbon dioxide gas and carboxylic acid which are always present in the human body.

The water leaving the anode compartment 3 (shown in the drawing by the dash-dot line $a_1$) is purified from microorganisms, but still retains an unpleasant chlorine smell. The water then flows into the cathode compartment 4, in which the following processes take place: electrolytic reduction on the surface of the electrode 7 and catalytic reduction within the volume of the compartment 4 of some organic impurities, such as, e.g. amino compounds, nitriles, accompanied by their hydrolytic splitting to form water and biologically inactive gases. Heavy metals ions, such as copper, zinc, nickel, lead, mercury, etc., dissolved in water are converted to neutral atoms or inactive hydroxides which are nontoxic for the human body, since they do not act as oxidants in biochemical reactions. As hydroxyl groups are formed at the electrode 7, the pH value of water increases, accompanied by a significant increase therein of hypochlorite ions. These hypochlorite ions directly react with bacterial cells. As a result, irreversible changes take place in bacterial cells, their metabolism is disturbed, and bacteria perish owing to the high bactericidal effect of ClO⁻ ions. In the cathode compartment 4, the redox potential of the water changes to reach a level that is close to the redox potential of the human body. As a result, the water acquires an increased capacity to infiltrate through the cellular membranes of the human body and to participate in the metabolic processes of the human body.

Upon leaving the cathode compartment 4 of the electrolysis cell (chamber) 2, the water denoted in the drawing by a dash-dot line $a_2$ arrives at a filter 8 filled up with a solid porous carbonaceous material, such as, e.g. pure granulated graphite. A disintegration reaction of active chlorine takes place on the surface of the carbonaceous material:

$$2HClO + C \rightarrow 2HCl + CO_2$$

$$2NaClO + C \rightarrow 2NaCl + CO_2$$

As a result of these reactions in the filter 8, the water, still preserving its sterility, is liberated from the chlorine smell and becomes not only useful, but also pleasant to drink (its flow is shown in the drawing by a continuous line $a_3$).

The method of the present invention makes it possible to obtain pure drinkable water from water unsuitable for drinking because of various degrees of pollution. At this, the required depth of the water electrolytic treatment is achieved by varying the consumed amount of the electric current. Normally, for most types of naturally occurring waters, the electric current consumption is comprised within 110 to 220 Coulomb per liter (Coul/liter).

The method of the invention enables purification of water containing, as pollutants, salts in an amount of 0.1 to 1.5 g/l, microorganisms, such as, e.g. Salmonellae, intestinal bacilli, Pseudomonae, Polyviri. Legionellae pneumophillae present in a concentration of $10^6$–$10^7$ units per milliliter to the level required for drinking water.

We claim:

1. A water treatment method, consisting essentially of:
   a. providing an electrolysis cell;
   b. forming an anode compartment within said electrolysis cell by using an electrode serving as an anode;
   c. forming a cathode compartment within said electrolysis cell by using an electrode serving as a cathode;
   d. separating said anode compartment from said cathode compartment by a single permeable partition membrane;
   e. feeding a flow of water to be treated into said anode compartment to oxidize said water;

f. passing the flow of oxidized water through said anode compartment by-passing said permeable partition membrane;

g. letting the water flow from said anode compartment through a conduit and feeding it to said cathode compartment for changing the reduction-oxidation potential of the water;

h. passing direct current through the water between said electrode serving as anode and said electrode serving as cathode, said direct current value being determined from the following equation:

$$I = K \times (C)^{1/4} \times Q,$$

where

I is current amperage (A),

C is feed water mineralization equal to 0.1 to 1.5 grams/liter,

Q is the water flow rate (liters per hour), $$K = 0.056 \left( \frac{A \times h}{g^{1/4} \times l^{3/4}} \right)$$

wherein I/Q ratio is within the range of from about 110 to about 220 Coulomb/liter, and the field intensity vector between said electrodes is perpendicular to the direction of flow of the water passing through said anode compartment and cathode compartment, and the flow of water in said compartments are directed in parallel;

i. filtering the water, after its removal from said cathode compartment; and j. discharging the filtered water.

* * * * *